(12) United States Patent
Fernandez

(10) Patent No.: US 11,305,448 B1
(45) Date of Patent: Apr. 19, 2022

(54) FOOD CUTTING ASSEMBLY

(71) Applicant: Steven Fernandez, Forked River, NJ (US)

(72) Inventor: Steven Fernandez, Forked River, NJ (US)

( * ) Notice: Subject to any disclaimer, the term of this patent is extended or adjusted under 35 U.S.C. 154(b) by 0 days.

(21) Appl. No.: 17/152,400

(22) Filed: Jan. 19, 2021

(51) Int. Cl.
*B26D 3/24* (2006.01)
*A21C 15/04* (2006.01)

(52) U.S. Cl.
CPC .............. *B26D 3/245* (2013.01); *A21C 15/04* (2013.01)

(58) Field of Classification Search
CPC .......... A21C 15/04; B26D 3/24; B26D 3/245; B26D 1/553; B26D 5/008; B26D 5/08
USPC ............................................ 30/114, 302, 303
See application file for complete search history.

(56) References Cited

U.S. PATENT DOCUMENTS

| | | | | |
|---|---|---|---|---|
| 681,551 | A * | 8/1901 | Hulse et al. | B26D 3/245 33/525 |
| 725,891 | A * | 4/1903 | Templeton | B26D 3/245 33/525 |
| 2,003,253 | A | 5/1935 | Deutsch | |
| 2,424,015 | A | 7/1947 | Booker | |
| 2,727,475 | A * | 12/1955 | Fritschi | B26D 3/08 30/114 |
| 3,545,088 | A * | 12/1970 | Johnson | G01B 5/08 33/501 |
| 4,072,075 | A * | 2/1978 | Ezaki | A21C 15/04 30/114 |
| 7,266,894 | B1 | 9/2007 | Hinckley | |
| 7,984,667 | B2 * | 7/2011 | Freudinger | B26D 3/245 83/620 |
| D734,105 | S | 7/2015 | McClellan | |
| 9,259,847 | B2 | 2/2016 | White, III | |
| 10,209,052 | B1 * | 2/2019 | Keen | A21C 15/00 |
| 2007/0221029 | A1 * | 9/2007 | Freudinger | B26D 3/245 83/544 |
| 2008/0178470 | A1 | 7/2008 | Peterson | |
| 2009/0241344 | A1 * | 10/2009 | Mastroianni | A47J 25/00 30/114 |
| 2012/0270600 | A1 | 10/2012 | Zelson | |
| 2016/0015044 | A1 | 1/2016 | Sy | |

(Continued)

FOREIGN PATENT DOCUMENTS

| CN | 106426358 A | * | 2/2017 | ............ B26D 3/26 |
| CN | 108994877 A | * | 12/2018 | ............ B26B 5/008 |

(Continued)

OTHER PUBLICATIONS

FR-2979213 A1 English translation; Mar. 2013 Alexis Daniel Aristide; A47J17/02.*

(Continued)

*Primary Examiner* — Laura M Lee

(57) ABSTRACT

A food cutting assembly a loop that has a circular shape. The loop includes a plurality of sections telescopically coupled together to allow a diameter of the loop to be selectively adjusted. The sections are comprised of a resiliently flexible material. A spanning member is attached to an inner surface of the loop and traverses a diameter of the loop. The spanning member includes a middle section and a pair of end sections. Each of the end sections extends into and is slidably extendable outwardly of the middle section. The middle section and the end sections each have a bottom surface comprising a cutting member.

4 Claims, 4 Drawing Sheets

(56) References Cited

U.S. PATENT DOCUMENTS

2017/0231234 A1    8/2017  Evans
2019/0246650 A1 *  8/2019  Jackson ................. B26D 3/245

FOREIGN PATENT DOCUMENTS

CN    109093656 A  * 12/2018  ............. B26B 5/008
FR      2979213 A1 *  3/2013  ............. A47J 17/02

OTHER PUBLICATIONS

CN-106426358-A English Translation Shandong Dingchuang CNC EQ; B26D3/26.*

* cited by examiner

FOOD CUTTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dessert cutting devices and more particularly pertains to a new dessert cutting device that is extendable around a circular dessert and then moved down to cut the dessert into a plurality of pieces. The device has an adjustable circumference to tailor fit the size of the dessert. Moreover, the blades are movable to adjust the size of the pieces to be cut as well as the number of pieces to be provided.

(2) Description of Related Art Including Information Disclosed Under 37 CFR 1.97 and 1.98

The disclosure and prior art relates to dessert cutting devices for cutting a dessert into a plurality of pieces using a single cut.

BRIEF SUMMARY OF THE INVENTION

An embodiment of the disclosure meets the needs presented above by generally comprising a loop that has a circular shape. The loop includes a plurality of sections telescopically coupled together to allow a diameter of the loop to be selectively adjusted. The sections are comprised of a resiliently flexible material. A spanning member is attached to an inner surface of the loop and traverses a diameter of the loop. The spanning member includes a middle section and a pair of end sections. Each of the end sections extends into and is slidably extendable outwardly of the middle section. The middle section and the end sections each have a bottom surface comprising a cutting member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
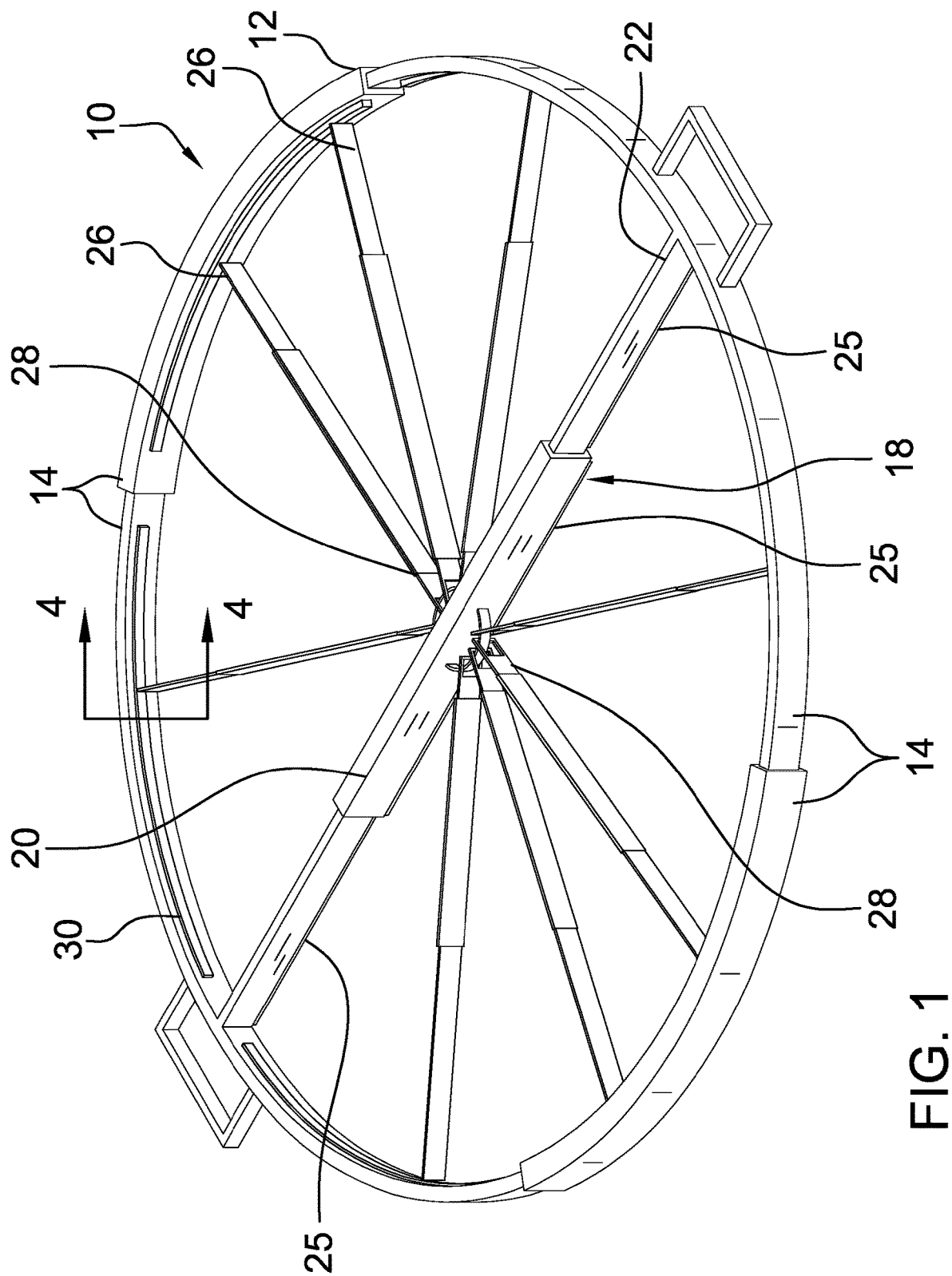
FIG. 1 is a top isometric view of a food cutting assembly according to an embodiment of the disclosure.
Figure 2:
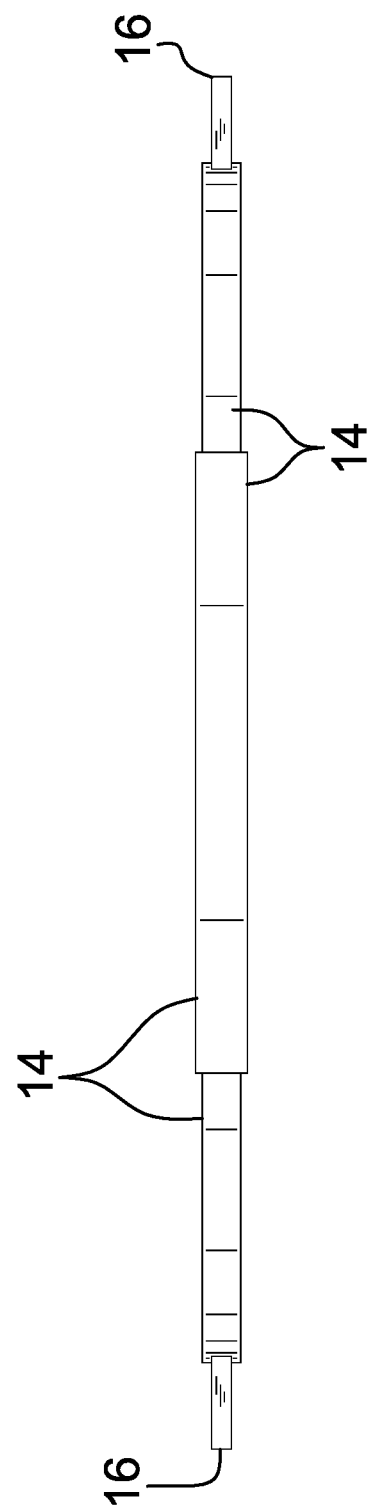
FIG. 2 is a side view of an embodiment of the disclosure.

With reference now to the drawings, and in particular to FIGS. 1 through 4 thereof, a new dessert cutting device embodying the principles and concepts of an embodiment of the disclosure and generally designated by the reference numeral 10 will be described.

As best illustrated in FIGS. 1 through 4, the food cutting assembly 10 generally comprises a loop 12 that has a circular shape. The loop 12 includes a plurality of sections 14 that are telescopically coupled together to allow a diameter of the loop 12 to be selectively adjusted. The sections 14 are comprised of a resiliently flexible material such as plastics or metals including thin steels or aluminum. This allows the sections 14 to deform slightly as the loop 12 is made smaller or larger as needed to encompass a circular desert, for example. A pair of handles 16 is attached to the loop 12 and are positioned opposite of each other. The handles 16 extend outwardly away from the loop 12.

A spanning member 18 is attached to an inner surface of the loop 12 and traverses a diameter of the loop 12. The spanning member 18 includes a middle section 20 and a pair of end sections 22. Each of the end sections 22 extends into and is slidably extendable outwardly of the middle section 20. The middle section 20 and the end sections 22 each have a bottom surface comprising a cutting member 25 such that the spanning member 18 is capable of cutting through a food item.

Figure 3:
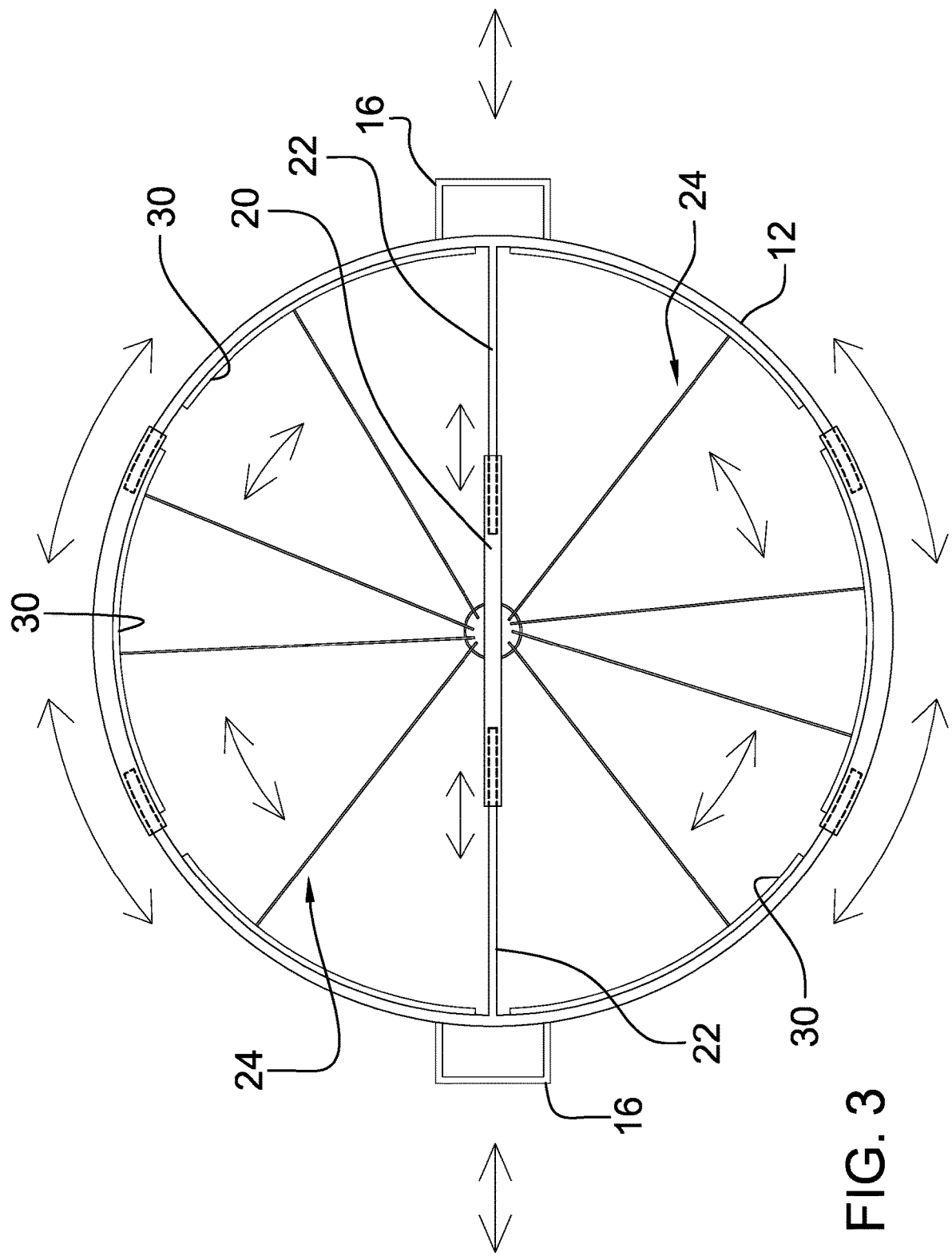
FIG. 3 is a top view of an embodiment of the disclosure.
Figure 4:
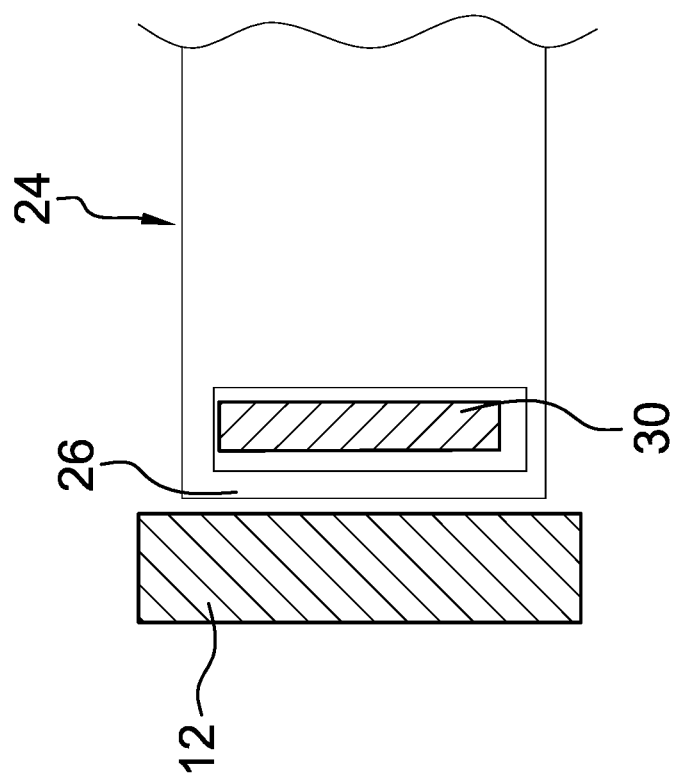
FIG. 4 is a cross-sectional view of an embodiment of the disclosure taken along line 4-4 of FIG. 1.

A plurality of blades 24 is provided. Each of the blades 24 has an outer end 26 attached to the loop 12 and an inner end 28 attached to the middle section 24. Each of the blades 24 is telescopic and has an adjustable length such that the length of the blades 24 is adjusted as a diameter of the loop 12 is adjusted. Each of the outer ends 26 is movable along a portion of the loop 12 and each of the inner ends 28 is movable relative to the middle section 20. The inner ends 28 may be coupled to a partial ring as can be seen in FIG. 3. The outer ends 26 are attached to slides 30 mounted to the loop 12. The ability to move the blades 24 relative to the loop 12 allows the user to move blades 24 together, if desired, to lower the number of effective cuts. That is, when two blades 24 are moved against each other they will only made a single, effective cut into the food item.

In use, the loop 12 is adjusted to match a diameter of a food items, such as for example a dessert. The desserts will tend be softer desserts like a cheesecake. The blades 24 are movable to allow the user to select the size of the food portions to be formed with the assembly 10 and the total number of portions.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cutting assembly configured for dividing a circular food item into a selectable number of discrete pieces, the assembly comprising:
   a loop having a circular shape, the loop including a plurality of sections being telescopically coupled together to allow a diameter of the loop to be selectively adjusted, the sections being comprised of a resiliently flexible material;
   a spanning member being attached to an inner surface of the loop and traversing a diameter of the loop, the spanning member including a middle section and a pair of end sections, each of the end sections extending into and being slidably extendable outwardly of the middle section, the middle section and the end sections each having a bottom surface comprising a cutting member, the spanning member including a pair of arcs, each of the arcs being fixed to the middle section on a respective side of the middle section, each of the arcs having a fixed length; and
   a plurality of blades, each of the blades having an outer end attached to the loop and an inner end attached to an associated one of the arcs extending from the middle section, each of the blades being telescopic and having an adjustable length.

2. The cutting assembly according to claim 1, further including a pair of handles being attached to the loop, the handles being positioned opposite of each other, the spanning member being linearly aligned between centers of the pair of handles.

3. The cutting assembly according to claim 1, wherein each of the outer ends is movable along a portion of the loop, each of the inner ends being movable relative to the middle section.

4. A cutting assembly configured for dividing a circular food item into a selectable number of discrete pieces, the assembly comprising:
   a loop having a circular shape, the loop including a plurality of sections being telescopically coupled together to allow a diameter of the loop to be selectively adjusted, the sections being comprised of a resiliently flexible material;
   a pair of handles being attached to the loop, the handles being positioned opposite of each other;
   a spanning member being attached to an inner surface of the loop and traversing a diameter of the loop, the spanning member being linearly aligned between centers of the pair of handles, the spanning member including a middle section and a pair of end sections, each of the end sections extending into and being slidably extendable outwardly of the middle section, the middle section and the end sections each having a bottom surface comprising a cutting member, the spanning member including a pair of arcs, each of the arcs being fixed to the middle section on a respective side of the middle section, each of the arcs having a fixed length;
   a plurality of blades, each of the blades having an outer end attached to the loop and an inner end attached to an associated one of the arcs extending from the middle section, each of the blades being telescopic and having an adjustable length; and
   each of the outer ends being movable along a portion of the loop, each of the inner ends being movable relative to the middle section.

\* \* \* \* \*